United States Patent [19]

Matsueda

[11] Patent Number: 5,329,508
[45] Date of Patent: Jul. 12, 1994

[54] REGENERATING DEVICE FOR OPTICAL RECORDING MEDIUM IN WHICH OVERLAPPING REGIONS ARE READ OUT BY A LIGHT BEAM IN A TIME SHARING MANNER TO PROVIDE SERVO CONTROL OF THE POSITIONAL RELATIONSHIP BETWEEN THE LIGHT BEAM AND THE MEDIUM

[75] Inventor: Akira Matsueda, Tachikawa, Japan

[73] Assignee: Olympus Optical Co., Ltd., Tokyo, Japan

[21] Appl. No.: 969,340

[22] Filed: Oct. 30, 1992

[30] Foreign Application Priority Data

Nov. 1, 1991 [JP] Japan .................................. 3-287906

[51] Int. Cl.$^5$ .............................................. G11B 7/00
[52] U.S. Cl. .............................. 369/44.11; 369/44.34; 369/44.35; 369/44.42
[58] Field of Search ............... 369/44.11, 44.12, 44.41, 369/44.42, 44.34, 54, 58, 112, 110, 44.35; 250/201.5

[56] References Cited

U.S. PATENT DOCUMENTS 5,155,718 10/1992 Hashimoto et al. .................. 369/58
5,157,249 10/1992 Hashimoto et al. ............. 369/44.25

FOREIGN PATENT DOCUMENTS 1-258228 10/1989 Japan .

OTHER PUBLICATIONS

JOIT, vol. 3, No. 2/1988, pp. 32–38.

Primary Examiner—Andrew L. Sniezek
Assistant Examiner—Mohammad Edun
Attorney, Agent, or Firm—Armstrong, Westerman, Hattori, McLeland & Naughton

[57] ABSTRACT

A regenerating device for an optical recording medium which includes a detector preferably consisting of a charge modulation device and cell groups disposed in a matrix configuration, readout switches, a column selecting device for selecting the readout switches provided at every column on the basis of inputted column-address information, and a row selecting device for selecting cells in a specific row on the basis of inputted row-address information. The regenerating device further includes a readout device for defining, by time sharing, a cell region in a predetermined position of all of the cells disposed in the detector so as to read out detecting signals by time-sharing from these cells. The regenerating device controls a servo-control device controlling an optical head by using the detected signal in the detector, and furthermore, reads information recorded in a medium by using a reading device.

5 Claims, 8 Drawing Sheets

▨ CLOCK B1 CELL GROUP  ▧ CLOCK B2 CELL GROUP

FIG.14

REGENERATING DEVICE FOR OPTICAL RECORDING MEDIUM IN WHICH OVERLAPPING REGIONS ARE READ OUT BY A LIGHT BEAM IN A TIME SHARING MANNER TO PROVIDE SERVO CONTROL OF THE POSITIONAL RELATIONSHIP BETWEEN THE LIGHT BEAM AND THE MEDIUM

BACKGROUND OF THE INVENTION

1. Field of the Invention

The present invention relates to a regenerating device for an optical recording medium, and more particularly, to a regenerating device using a two-dimensional image sensor as a detector for detecting signals.

2. Description of the Related Art Statement

Related art will be described with specific reference to FIGS. 1 to 5.

Figure 1:
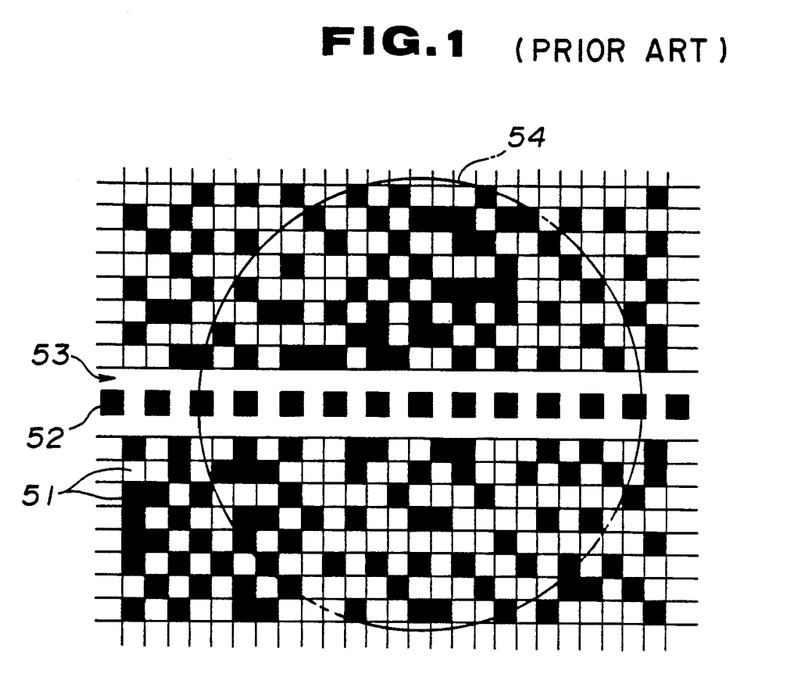
FIG. 1 is a schematic diagram illustrating a formatting example of a recording medium.

In a regenerating device for an optical recording medium which reads out information from an optical recording medium such as an optical disk, a photomagnetic disk, an optical card, a light source irradiates the optical recording medium (hereinafter defined as a medium) to obtain a reflected light beam; a photoelectric conversion of the reflected light beam obtained from the surface of the recording medium by means of non-stack-type detector such as a silicon photo-diode is performed; and signal processing is applied to the converted electric signal to enable the readout of data. Maintaining the focus of the optical beam for reading out the data and following-up a track can be performed by creating an error signal from the detected signal of the detector and by conducting feed-back to the optical head. FIG. 1 shows an example of a format of the medium. In the example, both a data pit 51 and a clock pit 52 are recorded, and the format of the medium is configured by sixteen data lines which are divided by a clock line 53 into two groups each consisting of eight lines, and these two groups are disposed in a upper and lower region as viewed in FIG. 1. In a reading process, sixteen data in each column are confirmed by one clock edge. Reference numeral 54 indicates a light spot of the beam for reading out.

Figure 2:
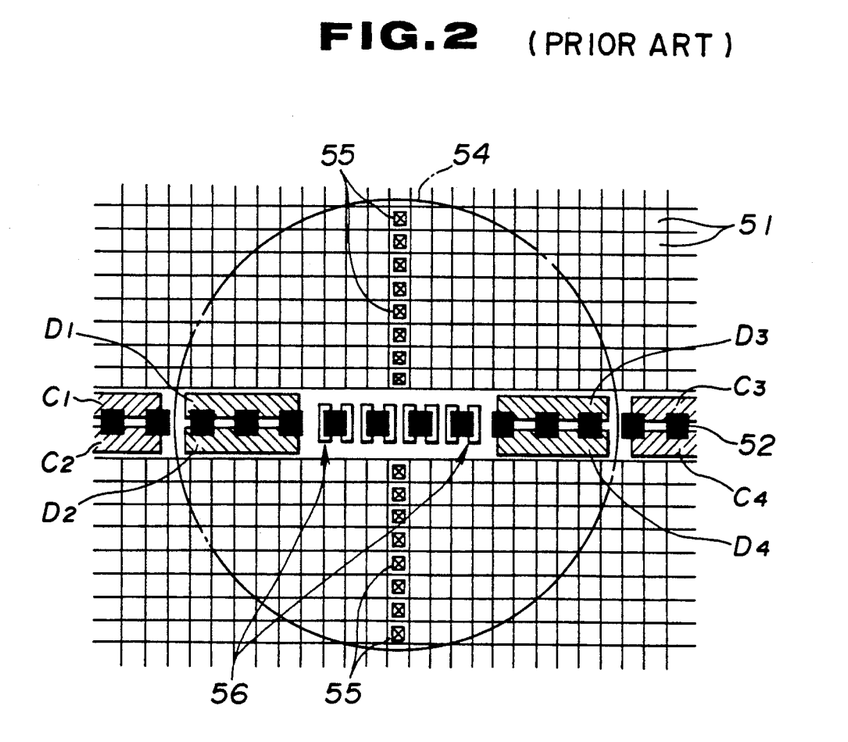
FIG. 2 is a schematic diagram illustrating a detector for detecting.

FIG. 2 shows a detector for detecting under the condition in which the surface of the recording medium is projected as shown in FIG. 1. In the data pit 51, the high and low levels of a reflection factor is represented by "1" and "0", respectively. The data is detected by data cells 55, sixteen of which are vertically disposed as viewed in FIG. 2. Four clock-cell groups 56 perform to detect a clock. Each edge of the clock signal regenerated by the cell group 56 is a confirmed timing for the data cell. The clock-cell group 56 configures a pair by two cells.

Figure 3:
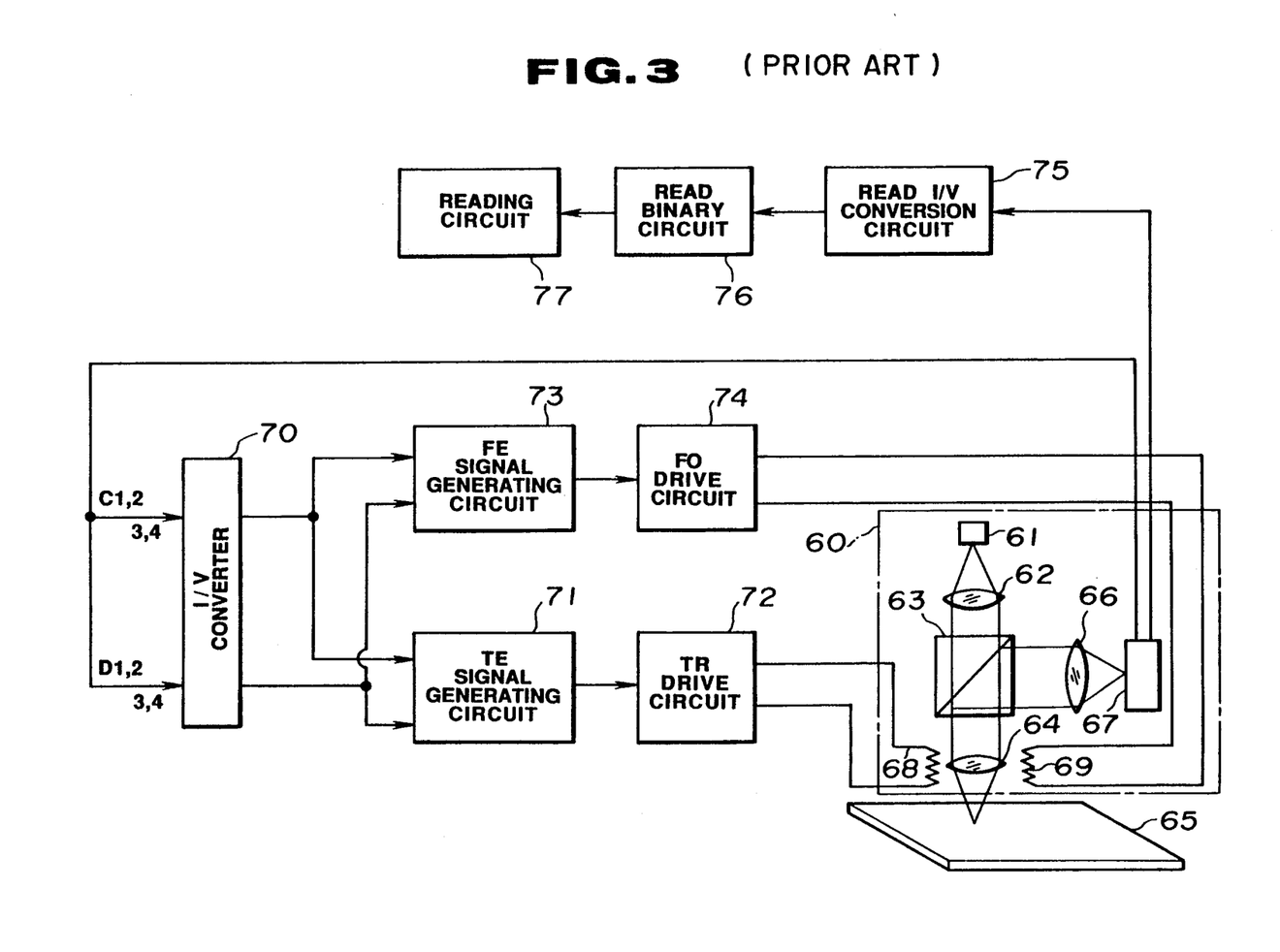
FIG. 3 is a schematic block diagram illustrating a configuration of an optical head and detecting system.

FIG. 3 shows an optical head 60 and a detecting system.

In the optical head 60 shown in FIG. 3, a light beam emitted from a light source 61, which is a light-emitting diode (LED), is made to be a parallel light by means of a collimator lens 62. The light beam emitted from the light source 61 through the collimator lens 62 passes through a beam splitter 63 and then, through an objective lens 64, is irradiated onto a recording medium 65. The reflected light from the recording medium 65 passes through the objective lens 64 and reflected by the beam splitter 63, and then passes through an image-forming lens 66 to be led to a detector 67. As a result, the image-forming lens 66 projects an image of the medium on the detector 67. The detector 67 comprises sixteen data cells 55, four clock-cell groups 56, and servo cells C1 through C4 and D1 through D4 as shown in FIG. 2. A tracking actuator 68 is employed to control the light spot 54 on the surface of the detector 67 so that the light spot 54 does not move perpendicularly to the track of the medium by allowing the objective lens 64 to travel perpendicularly to the track of the medium. A focusing actuator 69 is employed to focus the light spot 54 by allowing the objective lens 64 to travel perpendicularly to the surface of the recording medium 65.

As shown in FIG. 2, in the focussed condition, the cells C1 through C4 are situated outside of a foot (edge) of the light spot 54, and the cells D1 through D4 are situated inside of the foot of the light spot 54.

As shown in FIG. 3, the detecting system of the device comprises: a servo cell I/V converting circuit 70 which converts the output currents of the cells C1 through C4 and the cells D1 through D4 to their voltages; a tracking error (TE) signal-generating circuit 71 to which the voltage signals from the servo cell I/V converting circuit 70 are inputted; a track (Tr) drive circuit 72; a focus error signal-generating circuit 73 to which the voltage signals from the servo cell I/V converting circuit 70 are inputted; and a focus (Of) drive circuit 74. The detecting system comprises: a read I/V conversion circuit 75 which converts the output currents (read signals) of the read cell groups 55 to their voltages; a binary circuit 76 which converts the read signal, which is converted into voltage, into a binary value; and a reading circuit 77 which executes data reading by binary valued read signals and clock signals (not illustrated).

The operation of the device is described as follows.

Figure 4:
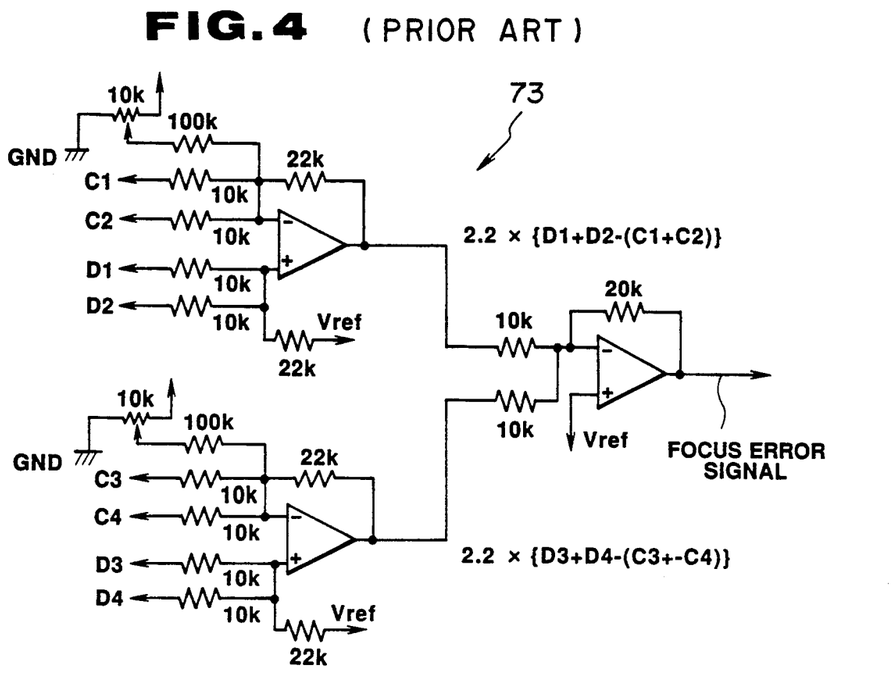
FIG. 4 is a circuit diagram illustrating a focus-error detecting circuit.

The detection of the focus location is enabled by detecting a variation of the diameter of a light beam on the surface of the detector. Therefore, the focus location is maintained by applying feed-back to the focus-error signal generating circuit 73 in the focussed condition so as to make the difference of the cells disposed in the foot of the beam shown in FIG. 2 zero. More specifically, maintaining the focus is achieved by applying a feed-back error signal to the focus drive actuator, wherein the error signal is calculated as the difference ($\Sigma$ C-$\Sigma$ D) between the sum of signals of the cells C1 to C4, which is represented as $\Sigma$ C, and the sum of the signals of the cells D1 to D4, which is represented as $\Sigma$ D. FIG. 4 is a practical example of a focus-error signal-generating circuit 73.

Figure 5:
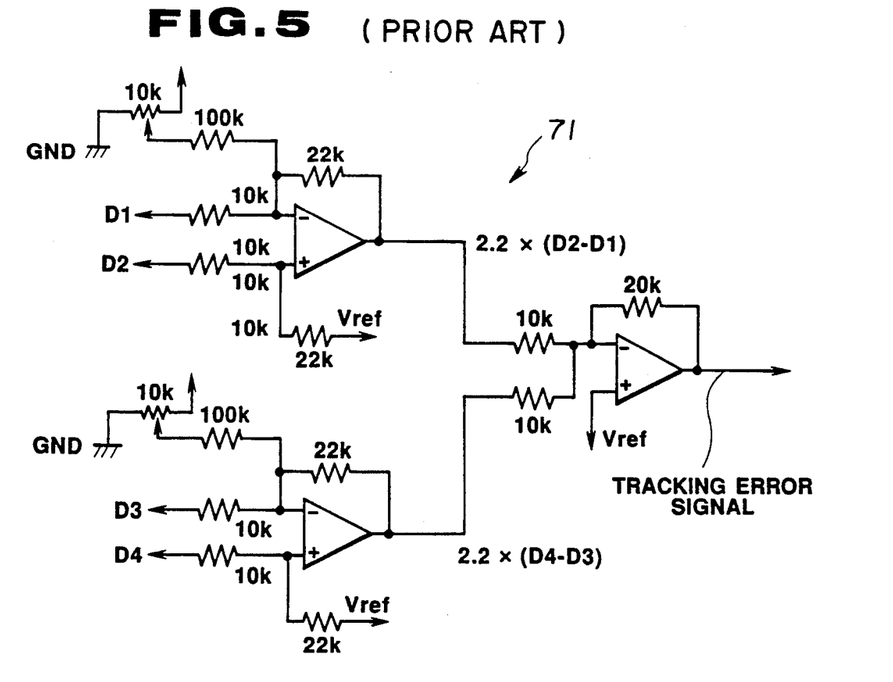
FIG. 5 is a circuit diagram illustrating a tracking error detecting circuit.

When the control is performed precisely in the tracking direction, the clock pit 52 is equally shared both by D1 and D2. The same situation can be applied to the cells D3 and D4. Accordingly, tracking servo is performed by making an error signal, which is represented by the equation of (D1+D3)−(D2+D4), and by feedback of the error signal into the tracking drive actuator 68. FIG. 5 shows a practical example of the tracking error signal-generating circuit 71.

To perform data reading, the clock signal must be generated. The generation of the clock signal can be obtained by converting the difference between the sum of the clock cells 56 disposed in the consecutive even order and the sum of these cells 56 disposed in the consecutive odd order into a binary value. Then, each of the sixteen data is converted into a binary value and sampled at each edge of the leading and trailing of the clock to become confirmed data. At this time, the data has been modulated after the interleaving by being added by the correction bit, thus a demodulation, de-interleaving, and the error correction can be performed to the data and the reading is completed.

However, in the detector of the above described related art, there exists a restriction in that an overlapping of each cell was not allowed when conducting the tracking servo, the focus servo, the data reading, and in conducting clock generation respectively. Therefore, there was a restriction in the shape and the disposition of these cells. For instance, when the detecting region of the cell groups D1 through D4, as shown in FIG. 2, were to be extended, it was impossible due to the interference of the clock cell groups 56, and the region which may be shared in the view point of effectiveness could not be shared. There has been a problem that the required sensitivity of the respective output signals, such as focus servo, could not be sufficiently obtained because the detecting region could not be extended. Furthermore, because the shape and the disposition of each cell group is fixed for the recording medium having a different format, one device, or one optical head and the detecting system, could not function with a plurality of recording media having different formats.

SUMMARY OF THE INVENTION

An object of the present invention is to provide a regenerating device for an optical recording medium which allows an overlapping of cells without being restricted by the shape and the disposition of each cell of the detector.

Another object of the present invention is to provide the regenerating device for an optical recording medium, wherein an extended detecting-region is available, and thus sufficient sensitivity can be obtained in each of the output signals such as the signals of servo, clock, data reading, because of the allowance of the overlapping of the respective cells and capability of sharing the cell regions.

A further object of the present invention is to provide the regenerating device for an optical recording medium, wherein the readout cannot be affected by dust, stain, or the like, of the medium due to obtaining a wide range of the sensitivity for each of the output signals such as the signals of the servo, the clock, and the data reading as described above.

Still a further object of the present invention is to provide the regenerating device for an optical recording medium, wherein the number of cells for the clock signals can be increased, and as a result, even if a pit of the medium is partially lacking due to dust and stain, the clock signal will not discontinue and thus enabling the stable data-reading.

An even further object of the present invention is to provide the regenerating device for an optical recording medium, wherein a cell region of a cell pattern, which adapts to each different format of the media, in accordance with the focus servo, the track servo, the clock, and the data reading, can be set, and thus enables functioning in conjunction with a plurality of the recording media having different formats.

The regenerating device for an optical recording medium of the present invention comprises:

light beam application means for applying a light beam from a light source onto an optical recording medium;

light detecting means to which a reflection light from the optical recording medium is applied as incident light, the light detecting means having an image sensor including a plurality of cells disposed two-dimensionally, the plurality of cells for storing charges by photoelectrically converting the incident light;

readout means for defining, by time sharing, a cell region in a predetermined position of all of the cells disposed two-dimensionally in the image sensor so as to execute time-sharing read-out of charges, which is stored in the cells, as a detecting signal;

servo control means for controlling a positional relationship of the light beam from the light source to the optical recording medium by processing one portion of the time-sharing detecting signals which are read out from the cells of the image sensor by the readout means; and reading means for reading information recorded on the optical recording medium by processing another portion of the time-sharing detecting signals which are read out from the cells of the image sensor by the readout means.

These and other objects, features and advantages of the present invention will become more apparent from the following description of the preferred embodiments taken in conjunction with the accompanying drawings.

BRIEF DESCRIPTION OF THE DRAWINGS

FIG. 1 to FIG. 5 relate to the related art.

FIG. 6 to FIG. 14 relate to an embodiment of the present invention.

DETAILED DESCRIPTION OF THE PREFERRED EMBODIMENTS

A regenerating device for an optical recording medium, shown in FIG. 6, employs a charge modulation device (hereinafter defined as CMD) in which a high-speed readout is made possible by a two-dimensional image sensor of a stack type to detect signals such as a servo signal, a clock signal, and a data signal. Also in the regenerating device, required detecting-signals are obtained by a high-speed readout of a plurality of cells, which are included in a plurality of predetermined regions, with time sharing in a number of cells included in the CMD without being restricted by the shape of the cell. The foregoing cell can store an incident light by a photoelectric conversion. As the CMD is disclosed in the Television Journal Vol.41, No.11 '87, a description of the solid state properties of the CMD as a semiconductor is omitted.

Figure 8:
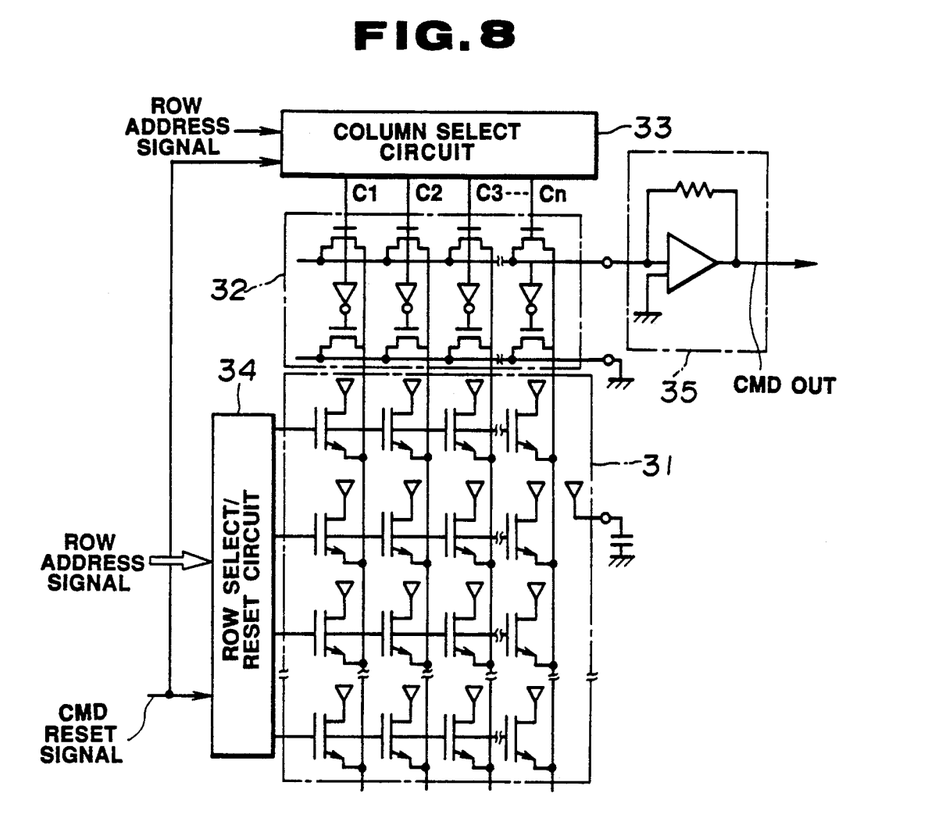
FIG. 8 is a configuration diagram of a CMD.

FIG. 8 is a schematic configuration diagram of the CMD.

A CMD 1 comprises a CMD cell group 31 disposed in the matrix-configuration of n×n, a readout switch 32, a column-select circuit 33 which selects a readout switch provided at every column on the basis of inputted column-address information, and a row select/reset circuit 34 for selecting a cell in a specific row on the basis of inputted row-address information. Furthermore, the CMD 1 enables a reset by holding a gate-potential of each cell into a specific potential and then releasing the stored charges into a substrate. The size of the cell is as much as 10 μm.

In the CMD 1, charges are stored/held proportionally to the level of the incident light of each cell. The readout of the cell of the CMD 1 is performed by defining an optional cell in each address of the rows and columns. The cell in the defined address (e.g. a plurality of cell groups) outputs a current, which is proportional (the sum of) to the stored charges, into an I/V conversion circuit 35 through a MOS switch of the readout switch 32. The output of the I/V conversion circuit 35 is made by converting the sum of the current from each cell in which an address is defined.

Figure 9:
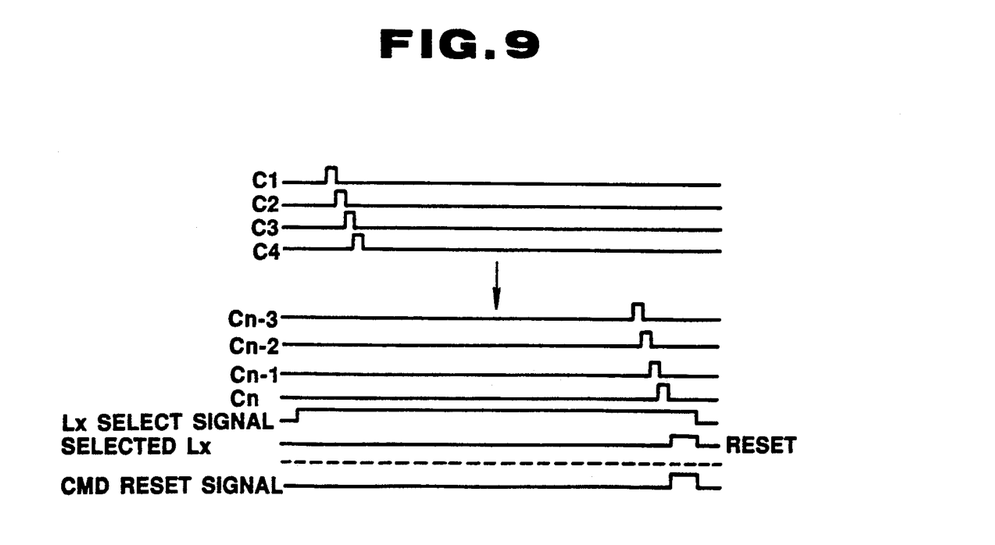
FIG. 9 is a timing chart of a readout of the CMD.

FIG. 9 is one example of a timing chart of the readout of the CMD 1. In the example shown in FIG. 9, the row select circuit 34 selects the row LX (e.g.selecting from L1 to Ln all at once), and at the same time, the column-select circuit 33 selects columns C1 to Cn in order to indicate the timing of reading out a predetermined cell in a time sequence by selecting a column from C1 to Cn in order.

Meanwhile, one feature of the foregoing CMD is that it can perform a high-speed nondestructive readout of an optional cell.

Figure 6:
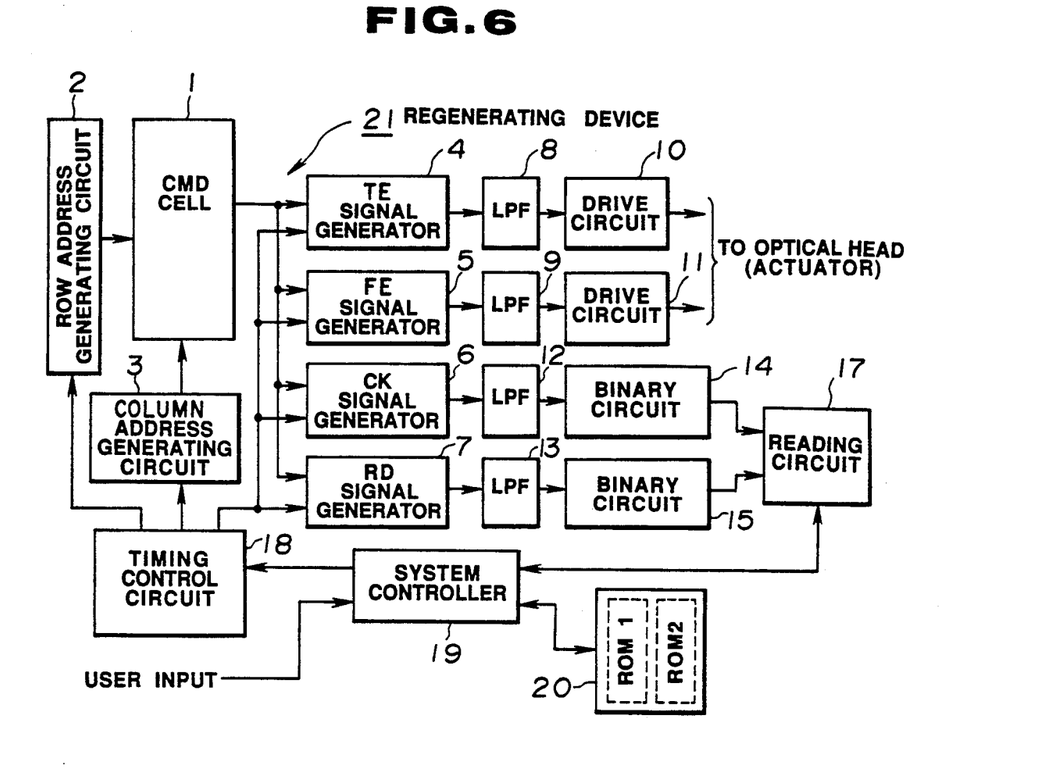
FIG. 6 is a block diagram illustrating an essential portion of a regenerating device.

FIG. 6 is a block diagram of the whole regenerating device. A drive system of the medium is not shown in the diagram.

A regenerating device 21 shown in FIG. 6 comprises the CMD 1, a row-address generating circuit 2 which generates the row address and outputs it to the CMD 1, and a column-address generating circuit 3 which generates the column address and outputs it to the CMD 1.

The regenerating device 21 comprises a tracking-error (hereinafter defined as TE) signal-generating circuit 4 which generates the tracking-error signal, a focus-error (hereinafter defined as FE) signal-generating circuit 5 which generates the focus-error signal, a clock (hereinafter defined as CK) signal-generating circuit 6 which generates the clock signal, and a read- (hereinafter defined as RD) signal generating circuit 7 which reads out the data Each of the foregoing signal-generating circuits functions to input a signal to detect and generate a predetermined signal from a cell group included in a plurality of predetermined cell regions in the CMD 1, which will be described later. The cell region of the CMD 1, a detailed description of which will follow, is different according to each detecting signal and a format of the recording medium.

The TE signal-generating circuit 4 and FE signal-generating circuit 5 output detecting signals to the drive circuits 10 and 11, respectively via low-pass filters (hereinafter defined as LPF) 8 and 9 which enable continuous output of discontinuous signals inputted in a time sequence. The drive circuits 10 and 11 enable proper driving control of objective lenses through a tracking actuator and focus actuator, respectively.

The detecting signals of the CK signal-generating circuit 6 and RD signal-generating circuit 7 become binary clock signals and data regenerating-signals in binary circuits 14 and 15 through LPF12 and 14, respectively. In a reading circuit 17, a sampling of the regenerating signals in a timing of a leading and trailing of the clock signals which are obtained by converting them into binary values, then a demodulation, a de-interleaving, and an error correction are performed, and thus the final readout signal is obtained.

Furthermore, the regenerating device 21 comprises a timing control circuit 18 which supplies timing pulses to address generating circuits 2 and 3 and the signal generating circuits 4 and 5, a system controller 19 which controls the total device and, at the same time, receives the reading signal; and a ROM 20 in which a plurality of cell patterns of the CMD 1 are stored as data in accordance with the format of each of the plurality of the recording media.

Figure 11:
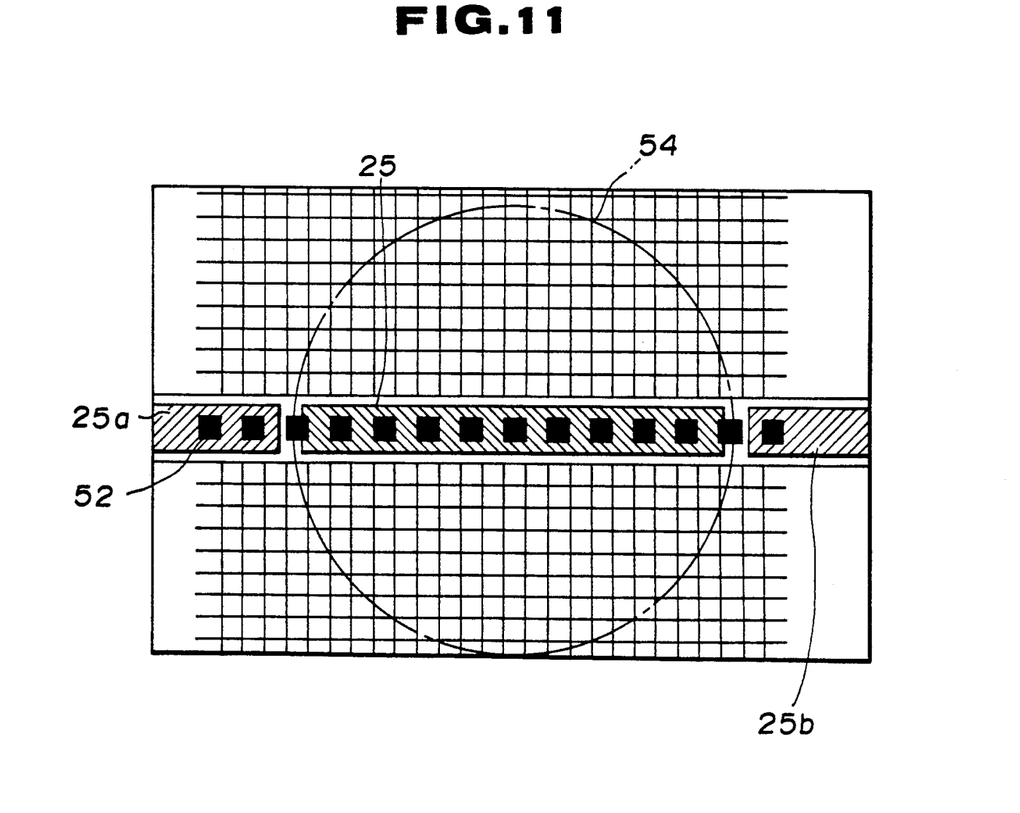
FIG. 11 is a schematic illustration showing a cell pattern for detecting a focus error signal in the CMD.
Figure 12:
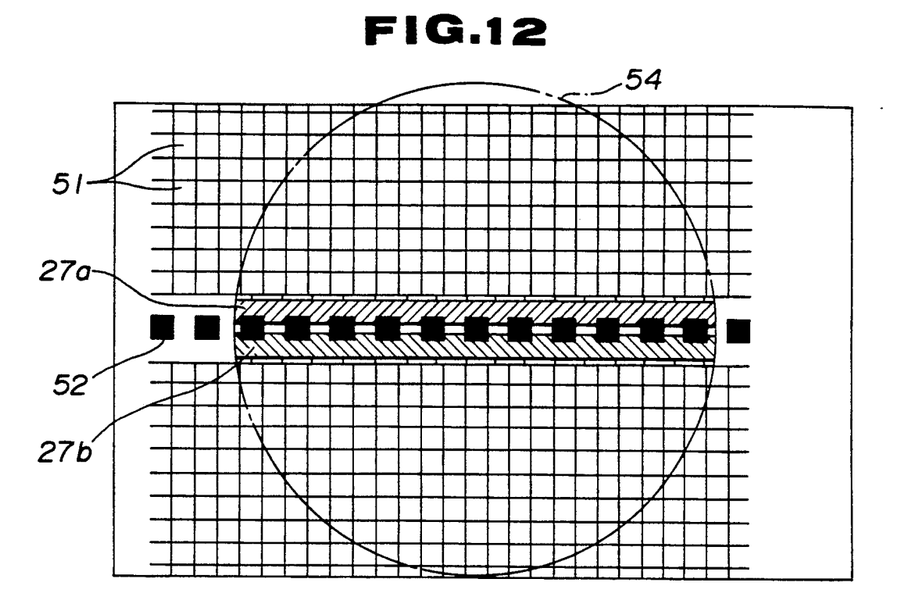
FIG. 12 is a schematic illustration showing a cell pattern for detecting a tracking error signal in the CMD.
Figure 13:
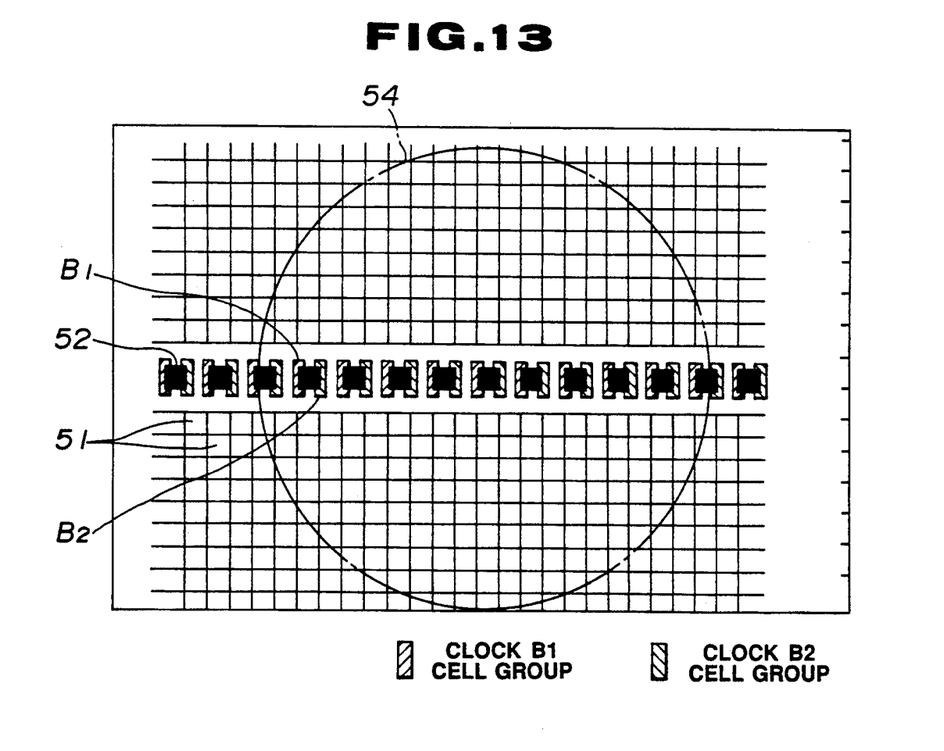
FIG. 13 is a schematic illustration showing a cell pattern for detecting a clock signal in the CMD.

With reference to FIG. 11 through FIG. 14, a description of each signal detection, when the CMD is used as a detector, is given. With reference to FIGS. 11 through 14, a description of each signal detection when the CMD is used as a detector is given below. FIGS. 11 through 14 show the situation in which the same format as the recording medium shown in FIG. 13 is imaged on the CMD 1. In FIGS. 11 through 14, each mesh represents the data pit 51 in which a plurality of cells, although not exclusively, of the CMD correspond to one data pit 51. Reference numeral 52 indicates a clock pit.

FIG. 11 indicates a focus cell-pattern of the CMD 1 for detecting a focus error signal.

In the CMD 1, the cell region (the cell group) 25 is defined within an edge of a light beam 54, and other cell regions 25a and 25b are defined, respectively, outside of the light beam 54. Defining the cell region is performed by the system controller 19 on the basis of the data in the ROM 20 through the timing control circuit 18. When an addressing of all the cells in the cell regions 25a and 25b of the two outside areas from the edge of the light beam 54 is performed at one time, a current, to which an output is added, is fetched. On the other hand, when an addressing of all the cells in the cell region 25 within the edge of the light beam 54 is performed at one time, the sum of the current of the region is fetched. The respectively fetched current in the regions 25, 25a, and 25b are discrete signals in a time-wise; therefore, the continuous focus error can be obtained after I/V conversions of the current 25, 25a, and 25b by an I/V conversion circuit 35, a sampling/holding thereof in the FE signal generating circuit 4, subtraction, and LPF application by a LPF8 are performed.

FIG. 12 shows the tracking cell pattern of the CMD 1 when the tracking error signal is detected.

In the same manner as described before, in the CMD 1, the cell regions 27a and 27b are defined in the upper and lower regions, as viewed in FIG. 12, divided by the clock pit 52 on the basis of the data in the ROM 20. When an addressing of all the cells in each of the cell regions 27a and 27b, in order, is performed at one time, the sum of the current of each cell region is fetched. The respectively fetched current of each of the cell regions 27a and 27b is a discrete signal in a time-wise; therefore, the continuous tracking-error signal can be obtained after I/V conversions of the current by the I/V conversion circuit 35, a sampling/holding thereof in the TE signal generating circuit 5, the subtraction, and LPF by LPF9 are performed.

FIG. 13 shows a cell pattern of the clock signals for data readout. In the same manner as described above, in the CMD 1, cell regions B1 and B2 are defined in the right and the left, respectively, as viewed in FIG. 13 in a manner such that the B1 and B2 regions are disposed by overlapping both parallel sides of each of the clock pits 52 of the beam spot 54. Clock signals are converted into continuous signals of those by reading out a plurality of cell regions B1 and B2 disposed in consecutive even order and odd order, respectively, and also by the I/V conversion, sampling/holding, subtraction (B1-B2), and performing LPF.

Figure 14:
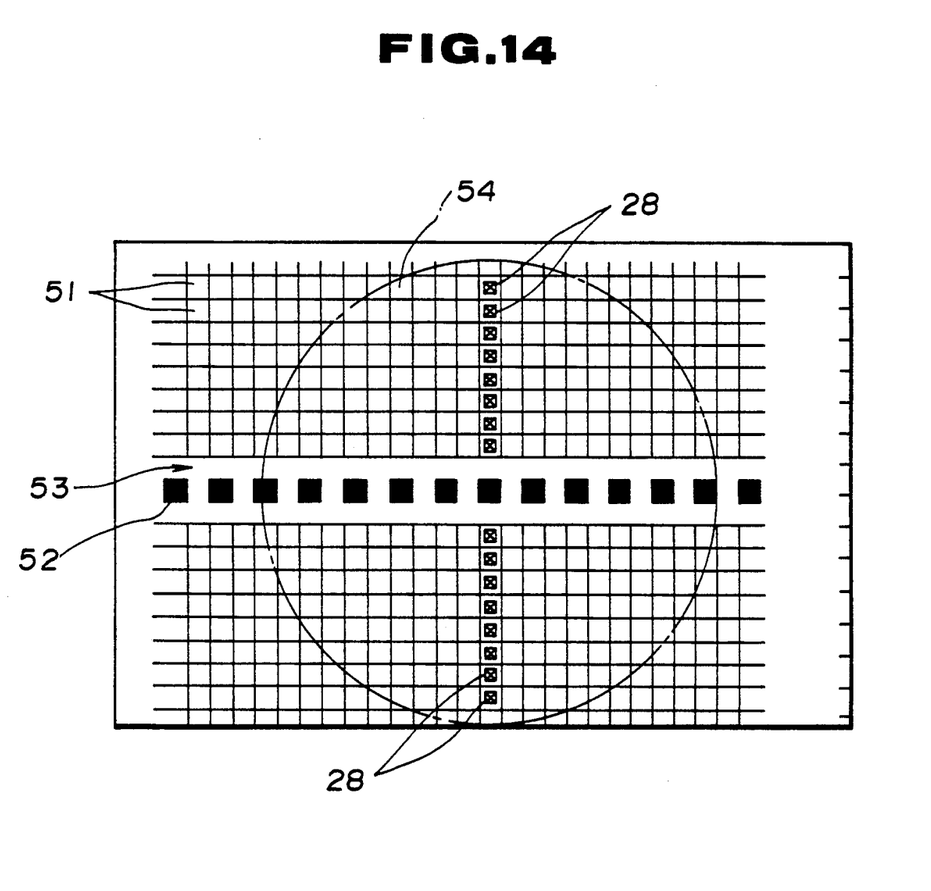
FIG. 14 is a schematic illustration showing a cell pattern for reading a data signal in the CMD.

FIG. 14 shows the cell pattern of the reading signals. In the same manner as described above, in the CMD 1, sixteen reading-cell regions 28 are disposed in a manner such that a clock line 53 divides the reading-cell regions 28 into two groups each consisting of eight of the reading-cell regions 28. Continuous signals can be obtained by reading out the sixteen reading-cell regions 28 in a time sequence, performing the I/V conversion, sampling/holding, and performing the low-pass filter. Then, after the continuous signals are acquired, sixteen binary signals are sampled, in order, by the binary circuit 15 and the reading circuit 17 in a high speed at each edge of the binary clocks, then the reading signals can be obtained through demodulation, de-interleaving, and error correction.

Figure 7:
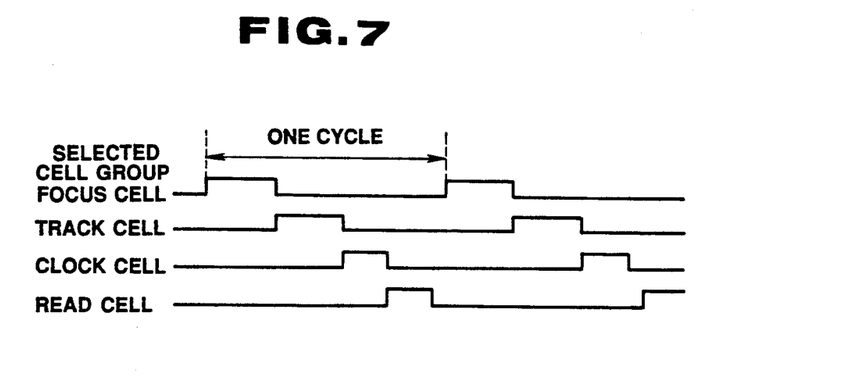
FIG. 7 is a timing chart of a readout of each detecting signal.

FIG. 7 shows a timing chart of the readout of each cell region, wherein one cycle is set to an amount of time for the clock signal to be regenerated sufficiently; namely, the time must be at least one half or less of the minimum pit pitch. For instance, it is 20 $\mu S$ in the preferred embodiment of the present invention.

Figure 10:
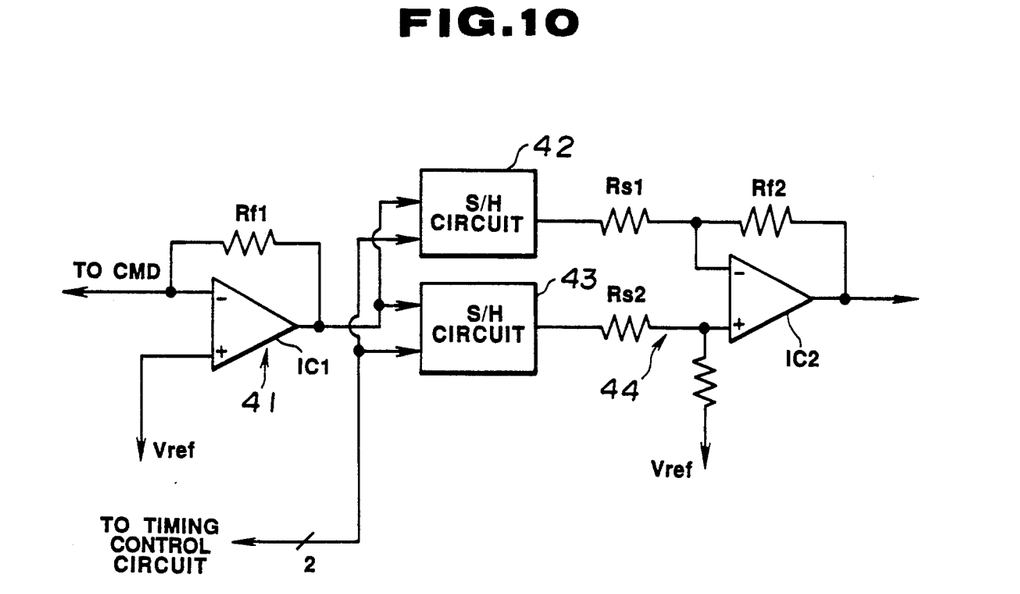
FIG. 10 is a circuit diagram showing an embodiment of a signal generating circuit.

FIG. 10 illustrates an example of the present invention of the signal-generating circuits (4, 5, and 6) for detecting the tracking error, the focus error, and the clock, respectively. The signal generating circuits 4, 5, and 6 have the identical configurations although the constant of a resistor and the like are different. The signal generating circuits 4, 5, and 6 comprise an I/V converter 41 including an op-amp IC1 and the like in the input stage; sample hold (S/H) circuits 42 and 43 which hold the signals, in order, outputted from the I/V converter 41 in a time sequence; and a subtraction device 44, including an op-amp IC2 and the like in the next stage, which fetches the differences of each output of the sample hold circuits 42 and 43.

As shown in FIGS. 11 through 14, each cell region does not suffer from the occurrence of overlapping in the region because of the readout performed by time sharing, has optimum size of area allocated therein; accordingly, sufficient levels of the amplitude of the error signal and the clock are obtained. Furthermore, these cell regions resist dust, stain, and the like. Because the number of the cells of the clock signals can be increased, the frequency of the stop of the clock signals is reduced when some of the pits are partially lacking due to dust or stain, thus enabling the stable readout of the data.

In the preferred embodiment of the present invention, the readout of each cell of the focus servo, the track servo, and the clock data is performed in the same frequency; however, there are some devices which have a rather lower servo band-area (mostly 1 to 2 KHz and below) in comparison with a frequency band-area of the data. Accordingly, it is made possible to change the frequency of the readout; namely, the period (frequency) of the servo can be lowered.

A description of the reading out a recording medium with a different format from the example shown in the previous diagrams is given.

A system controller 19 selects ROM 1 or ROM 2, for example, from the ROM 20 in accordance with the externally given command (user input) to define the address, which is suitable for the format and is controlled by timing, into the CMD 1. Simultaneously, the system controller 19 changes the sample-hold timing of each of the signal generating circuits into the optimum timing via a timing control circuit 18. In the CMD 1, a cell region having a suitable cell pattern for the above described format is defined in accordance with each readout of the focus servo, the track servo, clock, and data. Accordingly, the disposition and the shape of an optical detector, which conventionally has been fixed, can be changed by employing the CMD.

In the preferred embodiment of the present invention, a two-dimensional image sensor, as a detector for detecting the foregoing respective signals, is employed, wherein the CMD capable of a high-speed readout is used to set the cell regions of the track and focus servos, the clock, and the data readout at an optimum and maximum level to perform the readout with time sharing, thus the signal with sufficient sensitivity is obtained. In addition, by giving a user-input, the device of the present invention can be easily applied to a medium of a different format for recording.

Meanwhile, an image sensor comprising a plurality of optical sensors having a two-dimensional disposition can be configured by a SIT, a AMI, a MOS, or the like in addition to the CMD.

In this invention, it is apparent that working modes different in a wide range can be formed on the basis of this invention without departing from the spirit and scope of the invention. This invention is not restricted by its specific working modes except as limited by the appended claims.

What is claimed is:

1. A regenerating device for an optical recording medium comprising:

light beam application means for applying a light beam from a light source onto an optical recording medium;

light detecting means to which a reflection light from said optical recording medium is applied as incident light, said light detecting means having an image sensor including a plurality of cells disposed two-dimensionally, said plurality of cells for storing charges by photoelectrically converting the incident light;

readout means for defining, by time sharing, a cell region in a predetermined position of all of said cells disposed tow-dimensionally in said image sensor so as to execute time-sharing read-out of charges, which is stored in said cells, as a detecting signal;

servo control means for controlling a positional relationship of the light beam from said light source to said optical recording medium by processing one portion of said time-sharing detecting signals which are read out from said cells of said image sensor by said readout means; and reading means for reading information recorded on said optical recording medium by processing another portion of said time-sharing detecting signals which are read out form said cells of said image sensor by said readout means, wherein at least two cell regions, in a plurality of cell regions of said image sensor defined by said readout means, are overlapped to share a common region, and, wherein said servo control means processes said time-sharing signals obtained from cells included in said two cell regions and controls an optical head.

2. A regenerating device for an optical recording medium as defined in claim 1, wherein at least one part of said cell regions, in a plurality of cell regions of said image sensor defined by said readout means, shares an overlapping common region, and, furthermore, among said time-sharing signals which are read out from cells included in said one part of said cell regions, one portion of said signals are employed for said servo control means, and another portion of said signals are employed for obtaining clock signals which indicate a timing to read information recorded in said reading means.

3. A regenerating device for an optical recording medium as defined in claim 1, wherein said image sensor is a charge modulation device.

4. A regenerating device for an optical recording medium as defined in claim 1, wherein said readout means defines a cell region of a predetermined shape, composed of cells in predetermined positions among all of said cells disposed two-dimensionally in said image sensor so as to execute time-sharing read-out of a plurality of said cell regions.

5. A regenerating device for an optical recording medium comprising:

light beam application means for applying a light beam from a light source on an optical recording medium;

a detector in which a reflection light from said optical recording medium is applied as an incident light for said detector to convert photoelectrically said incident light so as t obtain detecting signals, said detector configuring an image sensor by including cell groups disposed in a matrix configuration, readout switches, column selecting means for selecting said readout switches provided at every column on the basis of inputted column-address information, and row selecting means for selecting cells in a specific row on the basis of inputted row-address information;

row-address generating means for generating row addresses and outputting information of said row address to said image sensor;

column-address generating circuit means for generating column addresses and outputting information of said column address to said image sensor;

readout means for defining, by time sharing, a cell region in a predetermined position of all of said cells disposed in said image sensor so as to execute time-sharing read-out of charges, which is stored in said cells, as a detecting signal;

servo control means for controlling a positional relationship of the light beam from said light source to said optical recording medium by processing one portion of said time-sharing detecting signals which are read out from said cells of said image sensor by said readout means; and reading means for reading information recorded on said optical recording medium by processing another portion of said time-sharing detecting signals which are read out from said cells of said image sensor by said readout means, wherein at least two cell regions, in a plurality of cell regions of said image sensor defied by said readout means, are overlapped to share a common region, and, wherein said servo control means processes said time-sharing signals obtained from cells included in said two cell regions and controls an optical head.

* * * * *